United States Patent

[11] 3,592,439

[72] Inventor John R. Ritchie, Jr.
c/o Ritchie Engineering Co. 999 E. 79th St., Minneapolic, Minn. 55420
[21] Appl. No. 850,533
[22] Filed Aug. 15, 1969
[45] Patented July 13, 1971

[54] FLUID LINE COUPLING WITH CHECK VALVE OPENER
3 Claims, 5 Drawing Figs.
[52] U.S. Cl. .................................................. 251/149.6, 251/149.4
[51] Int. Cl. ...................................................... F16l 37/10, F16l 37/28
[50] Field of Search .......................................... 251/149.4, 149.5, 149.6

[56] References Cited
UNITED STATES PATENTS
2,322,462  6/1943  Marquardt et al. ............ 251/149.5
2,881,011  4/1959  Coughlin ...................... 251/149.4 X Primary Examiner—William R. Cline
Attorney—Carlsen, Carlsen, Sturm & Wicks ABSTRACT: An inflation valve coupling wherein the valve-opening element in the female-coupling member is threaded into a surrounding sealing gasket of resilient material to securely position the element and enable axial adjustment thereof for opening engagement with inflation valve stems of varying axial positions within their valve housings.

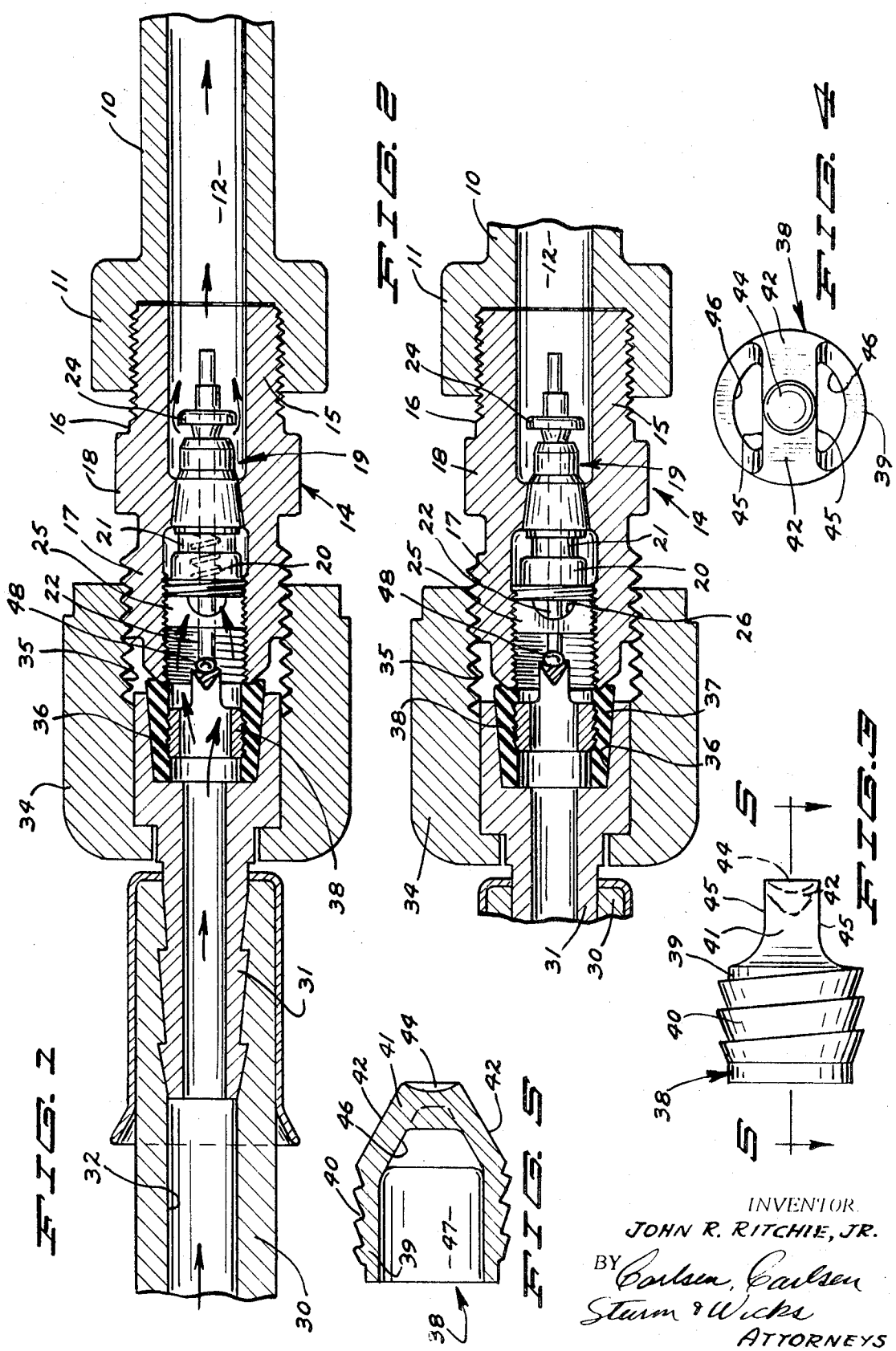

FLUID LINE COUPLING WITH CHECK VALVE OPENER

The fluid lines in refrigeration systems are generally provided with externally threaded end valves of the inflation type such as used in pneumatic tires and the like. These include the testing lines for checking the pressure and vacuum sides of the system as well as the charging line through which refrigerant is admitted to the system. A test and charging manifold embodying the appropriate gauges is used by the serviceman to check the system. This manifold is provided with hose sections which are readily connectable by couplings with testing and charging lines of the system. The couplings have internally threaded sleeves encircling a ported valve opener and as the sleeve is threaded onto the valve, the opener comes into endwise engagement with and depresses the stem of the inflation valve so as to open communication between the manifold hose and the line to which it is connected.

A problem frequently encountered is where the valve stem is not disposed at the desired axial position within the valve to be properly contacted by the opener. If it projects outwardly from the valve too far it may be depressed by the opener before the coupling with the line has been sealed. On the other hand, if it is recessed too far within the valve, it may not be engaged or at least not be depressed the desired distance by the valve opener when connection between the hose and line has been completed.

It is accordingly the object of the present invention to provide a coupling for refrigerant system testing and charging hoses with a valve opener which may be axially adjusted to properly engage and open the inflation valve on the line to which it is connected regardless of axial position of the valve stem within the valve.

With this and other objects in mind the invention broadly comprises providing the valve opener element with an external thread and threading the element into the interior cylindrical wall of the surrounding gasket of resilient material whereby the element is held securely in the gasket and may be axially adjusted therein.

The objects of the invention will be brought to light during the course of the following specification, reference being made to the accompanying drawing, in which:

FIG. 1 is a longitudinal diametrical section through the closed line connection, showing the valve in elevation, and with the valve opening element in opening engagement with the valve stem.

FIG. 2 is identical to FIG. 1 but shows the valve-opening element adjusted axially outward to a point where it can engage a valve stem which is further recessed within the valve.

FIG. 3 is an elevation view of the valve opening element removed from the coupling.

FIG. 4 is a front view of the valve-opening element.

FIG. 5 is a diametrical section taken through the valve-opening element along line 5—5 of FIG. 3.

Referring now more particularly to the drawing, reference characters will be used to denote like structural parts and features in the different views. The numeral 10 denotes a line, such as the charging line through which refrigerant is admitted to a refrigeration system. Line 10 has an internally threaded coupling sleeve 11 at one end and an internal passageway 12 which is blocked by an inflation valve 14 having its end portion 15 threaded into the sleeve 11.

Valve 14 has a generally tubular housing or nipple 16 with the end portion 15 and the opposite externally threaded end portion 17 interconnected by a wrench engageable nut portion 18. The passage through the housing 16 contains a spring biased valve 19 of conventional construction having a holding collar 20 threaded into the end portion 17 of housing 16. Collar 20 is connected to an elongated sleeve 21 which slidably holds an elongated valve stem 22 carrying a disc 24 on one end portion adapted to close and seal the end of sleeve 21 facing passageway 12. A spring (not shown) is disposed within sleeve 21 in encircling relation to stem 22 to yieldably retain disc 24 in closed position against the sleeve. The holding collar 20 has side portions cut away to provide a gripping head 25 and the head has opposing side ports 26 providing open communication with the interior of sleeve 21. It will accordingly be understood that when stem 22 is depressed inwardly toward line 10, the disc 24 will be unseated and the passageway 12 will be opened through the valve.

The numeral 30 denotes a hose on a refrigerant testing and charging manifold. The end of the hose receives a tubular insert 31 in its passageway 32 and the insert journals a coupling sleeve 34 which is internally threaded as at 35 for threaded connection with the end portion 17 of nipple 16. Insert 31 has a pocket 36 at its outer end for seating an annular gasket 37 of resilient material.

The valve opening element is designated generally at 38 and is best shown in FIGS. 3 to 5. It has a cylindrical base portion 39 having a spiral buttress thread 40 formed around the external surface thereof. The end portion or tip 41 of the element has opposing sidewalls 42 (FIG. 5) which taper inwardly to an inwardly dished face 44. The top and bottom walls, as viewed in FIG. 3, curve from the base 39 into parallelism as at 45. Ports 46 are provided through the walls 45 opening into the interior 47 of the base portion 39.

It will be understood that when the coupling sleeve 34 is tightly threaded upon the end portion 17 of valve 14, as in FIGS. 1 and 2, the element 38 will axially engage and depress the stem 22 with the face 44 of tip 41 abutting against the head 48 and disc 24 unseated from the end of sleeve 21. This opens the valve and passageway 32 is in open communication with passageway 12 through the insert 31, chamber 47, ports 46, the interior of valve portion 17, ports 26, sleeve 21 and the interior of portion 16. This conduit is sealed by the engagement between gasket 37 and the end of valve housing portion 17. The buttress thread 40 allows the element 39 to be threaded into the gasket 36 and holds it securely in position against fluid pressures flowing, in the direction of the arrows in FIG. 1, from hose 30 to line 10.

In the event that the valve 19 is seated more deeply in the housing 16 as shown in FIG. 2, before the lines are connected, a suitable wrench is used to grasp the tip 41 of element 38 and twist the element in a direction whereby it will be moved outwardly in the gasket 37 to a position where it can engage and depress the valve stem. Conversely, when the valve stem projects out of the valve more than the normal distance, the element 38 may be threaded further into the gasket so that the valve is not fully opened until the seal between gasket 36 and housing portion 17 has been effected. Accordingly, while element 38 is firmly secured in its surrounding gasket against axial sliding movement under pressures, it can be axially adjusted by rotary turning movement to open inflation valves having their stems disposed at varying depths within the valves.

The buttress thread 40 is a spiral thread which is asymmetrical. The leading side 49 or the side remote from nozzle 16 has a high flank angle with respect to the perpendicular to the axis of element 38 while the following side 50 has a low flank angle. Accordingly the thread resists expulsive pressures of element 18 in the indicated direction of fluid flow.

The invention accordingly economically and effectively carries out the aforementioned objectives. Having now therefore fully illustrated and described my invention, what I claim to be new and desire to protect by United States Letters Patent is:

1. In a coupling for joining the end of a first fluid line to the end of a second fluid line,
   a. said second fluid line having a valve nipple at its end surrounding an inflation valve,
   b. the inflation valve having an axial valve stem for opening the valve when depressed inwardly into the nipple,
   c. a spring means in the valve yieldably resisting said inward movement of the valve stem,
   d. a tubular coupling sleeve on the end of the first line for connection with the nipple,
   e. an annular gasket of resilient material mounted concentrically within the sleeve in position to form an annular seal against the end of the nipple when said connection is made, f. a valve opening element having an externally threaded cylindrical base portion of smaller axial dimension than the gasket threaded into the gasket for axial adjustment therein, g. said element having a tip projecting axially toward the second line to engage and depress the valve stem when the connection is made.

2. The subject matter of claim 1 wherein said tip has flat parallel opposing sidewalls to facilitate gripping thereof for axially adjusting the element within the gasket.

3. The subject matter of claim 1 wherein the side of the thread on the opening element facing the valve nipple has low flank angle and the opposing side of the thread has a high flank angle to resist fluid pressures tending to expel the element from the gasket in a direction toward the nipple.